United States Patent [19]

Hult

[11] Patent Number: 5,144,748
[45] Date of Patent: Sep. 8, 1992

[54] CLEANING DEVICE
[75] Inventor: Bror Hult, Flipstad, Sweden
[73] Assignee: FMG Timberjack AB, Sweden
[21] Appl. No.: 689,911
[22] PCT Filed: Oct. 19, 1989
[86] PCT No.: PCT/SE89/00577
§ 371 Date: May 30, 1991
§ 102(e) Date: May 30, 1991
[87] PCT Pub. No.: WO90/04502
PCT Pub. Date: May 3, 1990

[30] Foreign Application Priority Data
Oct. 21, 1988 [SE] Sweden .................................. 8803781
[51] Int. Cl.$^5$ ...................... B27G 19/04; A01D 34/84; A01G 23/08
[52] U.S. Cl. ........................................ 30/276; 30/286; 30/347; 56/12.7; 56/17.4; 56/255; 144/34 R
[58] Field of Search ............. 144/34 R; 56/17.4, 12.3, 56/12.5, 255, 295, 320.1, 320.2, 12.7; 30/276, 285, 286, 347

[56]        References Cited
U.S. PATENT DOCUMENTS
2,532,982 12/1950 De Young .
4,736,573 4/1988 Seck .

FOREIGN PATENT DOCUMENTS
0257566 3/1988 European Pat. Off. .
1757691 5/1971 Fed. Rep. of Germany .
1548806 10/1968 France .

Primary Examiner—W. Donald Bray
Attorney, Agent, or Firm—Nixon & Vanderhye

[57]              ABSTRACT

The invention relates to a blade-protecting device (13, 14) for cleaning units (1) being provided with a rotary cutter or blade (3) which is supported on a shaft (6) and which can be rotated by means of a motor (11). The shaft (6) is mounted in a body (8). The blade-protecting device (13, 14) comprises a hub part (13) having a diameter being smaller than the diameter or the largest dimension of the rotatable blade (3). This hub part (13) is arranged substantially coaxially with the shaft (6) adjacent the blade (3) and is freely rotatable relatively to the body (8). A number of fixed, substantially radially oriented arms (14) are rigidly attached to the hub part and extend past the periphery of the blade or of the circle described by the rotating blade, said arms (14) preferably being arranged in locations spaced equiangularly around the hub part.

8 Claims, 3 Drawing Sheets

CLEANING DEVICE

TECHNICAL FIELD OF THE INVENTION

The invention relates to a blade-protecting device for cleaning units for cleaning forests which are provided with a rotary cutter or blade which is supported on a shaft and which is rotatably by means of a motor, the shaft being mounted in a body. This kind of units are often mounted on a boom on a forestry vehicle and are used to clean shrubs and thickets.

BACKGROUND TO THE INVENTION

Wood cleaning tools have been used that normally are carried by a comparatively long boom which is mounted on a forestry vehicle the boom having a parallel motion and being swingable around the attachment point on the vehicle. The arm can be moved outwardly from and inwardly towards the vehicle, the cleaning unit at the end of the boom being kept at a constant height above the ground due to the parallel motion of the boom. The constant height can normally be adjusted. A disc being rotatably driven by a motor has been used as cleaning unit, the disc being provided with knifes or flails hingedly attached to the periphery of the disc. The knives or flails will move at a comparatively high speed due to the large diameter of the disc in conjunction with the high rotational speed of the disc, normally about 1500 rpm. Since the knifes or the flailing tools further have to be relatively heavy in order to function in the desired way, their total kinetic energy will be high. If the flails strike objects like stones or pieces of wood, these objects therefore may be thrown a great distance from the unit at a high speed, since it is almost impossible to mount a protective device which entirely covers the rotating disc, the flails in that case not being able to reach the vegetation which is to be cleaned. This device thus requires a very large safety area with a radius which may be up to 100 meters. Since the vehicle naturally is located within the dangerous area, the unit must be provided with a protection on the side facing the driver, which means that the unit only can clean when it is moved sidewardly or outwardly from the machine, which is a disadvantage. A further disadvantage is that it is difficult to increase the rotational speed, and thus the efficiency of the unit, since the flails or knifes then may be subjected to forces being large enough to tear the flails or knifes away which, apart from impairing the efficiency of the unit, also would constitute a great danger. This known device thus has some disadvantages.

It has been tried to use a rotating blade instead of a rotating disc provided with flails or knifes in order to obtain a unit which does not have these disadvantages. Such a construction in practice eliminates the risk that objects are thrown outwardly from the unit, which means that the safety radius can be decreased to more normal values. In this case, the blade however must be protected against contact with larger stones and similar, since the blade will not be deflected when striking a fix object, in contrast to the hingedly attached flails or knifes. An object of the invention thus is to obtain a protective device for the blade. This is especially important when the blade is provided with a few, comparatively large serrations, since the entire unit, including the motor and the bearings, will be subjected to severe shocks when these serrations strike a fix object if the butting edge squarely strikes the object, with the consequence that the blade is abruptly stopped. An extreme form of such a blade would be a blade similar to the kind of blades used in ordinary rotary grass-movers having an elongated knife with only two cutting edges.

THE BASIC CONCEPT OF THE INVENTION

This object is achieved by means of a blade protecting device which comprises a hub part having a diameter being smaller than the diameter or the largest dimension of the rotatably blade, said hub part being arranged substantially coaxially with the shaft and being freely rotatable relatively to the body, a number of fixed arms being rigidly attached to the hub part and extending past the periphery of the blade or of the circle described by the rotating blade, said arms preferably being arranged in locations being spaced equiangularly around the hub part.

BRIEF DESCRIPTION OF THE ATTACHED DRAWING

DETAILED DESCRIPTION OF A PREFERRED EMBODIMENT OF THE INVENTION

Figure 1:
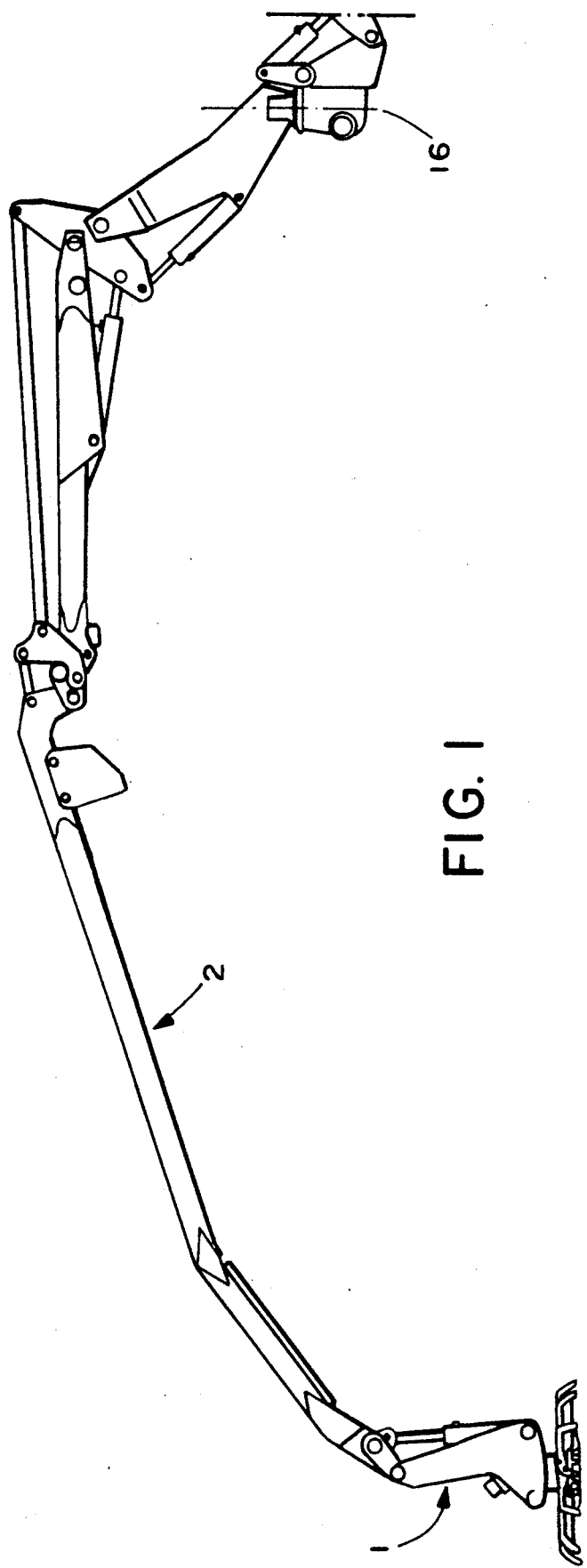
FIG. 1 illustrates a cleaning unit being attached to a crane boom with a parallel motion.

FIG. 1 illustrates how the cleaning unit, here generally designated 1, may be attached to a crane boom with a parallel motion, here generally designated 2, and mounted on a common forestry vehicle (now shown). As appears from the drawing, the arm can be rotated around a vertical axis 16 at the attachment point at the vehicle and can also be swung outwardly respectively inwardly relative the vehicle. As a consequence of the parallel motion of the arm, the cleaning unit will follow a rectilinear path in the movement outwardly respectively inwardly relative to the forestry vehicle. This path can be adjusted to be parallel with the ground. The arm per se is not part of the invention and therefore will not be described more closely herein.

Figure 2:
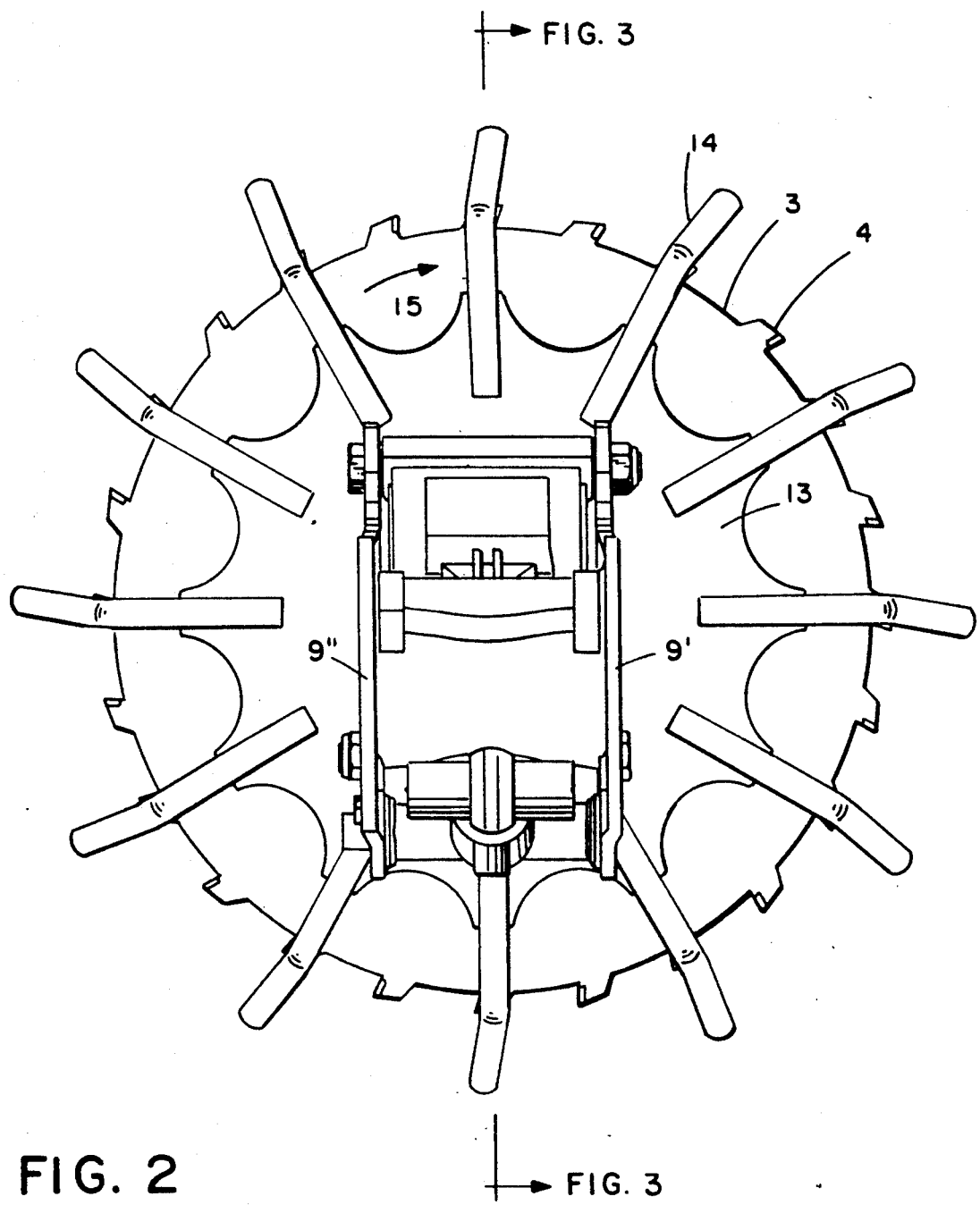
FIG. 2 illustrates the cleaning unit disconnected from the crane boom and seen from above.
Figure 3:
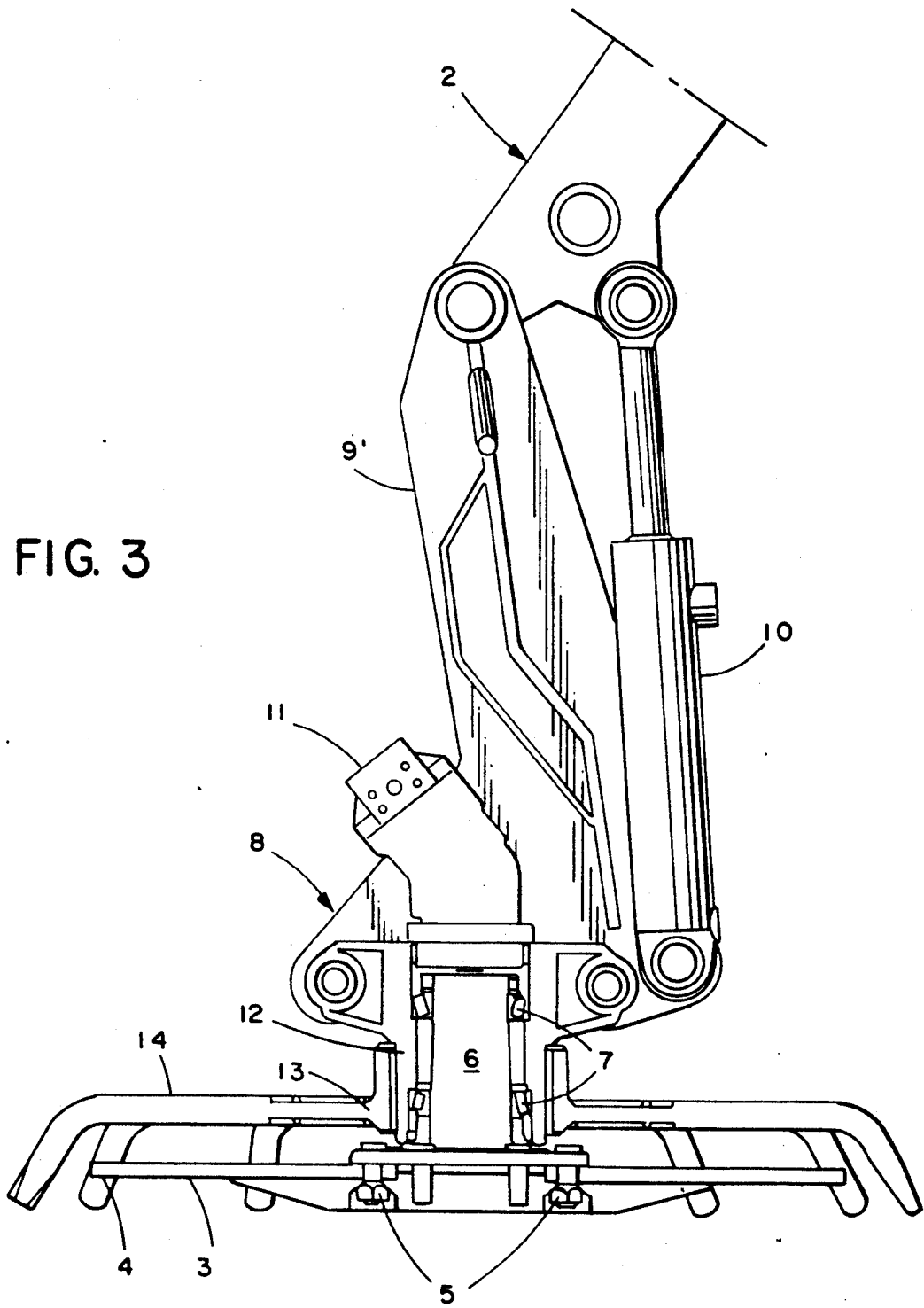
FIG. 3 illustrates a side elevation of the device in section along the line III—III in FIG. 2.

FIGS. 2 and 3 illustrate the cleaning unit more in closely. The blade 3 is provided with saw-teeth 4 and is attached to a rotatable shaft 6 by means of bolts 5, the shaft being mounted in a body 8 by means of roller bearings 7. The body 8 comprises two parts 9', 9" which extend upwardly. The parts 9', 9" are hingedly attached to the end of the boom 2 at their upper ends. A hydraulic cylinder 10 extends between the body 8 and the boom 2 for the angular adjustment of the cleaning unit. A hydraulic motor 11, which drives the blade by means of the shaft 6, is arranged between the two body parts 9', 9". The hydraulic motor 11 is in a usual manner supplied with hydraulic fluid by means of hydraulic conduits (now shown). The body 8 also comprises a part 12 which extends downwardly surrounding the shafts 6 and wherein the bearings 7 are arranged. A hub part 13 is arranged freely rotatable on the outer surface of this projecting part 12. The hub part 13 has a diameter which is smaller than the diameter of the blade. A number of fixed, radial arms 14 are rigidly attached to the hub part 13, which arms are equiangularly spaced around the periphery of the hub part. The arms extend beyond the periphery of the blade and are bent slightly downwardly past the outer edge of the blade, as best can be seen in FIG. 3. As shown in FIG. 2, those parts on the arms 14 which extend beyond the periphery of the blade are bent slightly in the same direction as the direction of the rotation of the blade. The rotational direction is indicated by means of the arrow 15 in FIG. 2. The distance between the arms 14 is chosen to allow the vegetation, which is to be cleaned, to reach the blade between two adjacent arms to contrast with the hub part 13. The hub part is cut out in a half circle between two adjacent arms 14. The distance between two adjacent arms is also chosen in such a way that larger stones, as well as larger trees which not are to be damaged by the blade, cannot reach sufficiently far in between two adjacent arms to come into contact with the blade. It may here be pointed out that stones or similar being narrow enough to correspond to the thickness of vegetation ripe for cleaning normally do not exist at the height the cleaning unit normally is moved over the ground when cleaning. If one of the arms would for instance squarely strike a smaller tree which is to be cleaned, the entire protective device will yield as a consequence of rotatably support of the hub part 13 in the body part 8. This is facilitated by the fact that the outer parts of the arms are slightly bent sidewardly. The primary purpose with this bending is however to counteract that matter is be wedged between arms and blade and/or between adjacent arms. The idea is to prevent that matter falling onto the rotating blade and carried along by the blade is stopped by the arms and thus wedged between the arm and the blade. Instead this matter is given an impulse by the blade which is directed outwardly along the arm, the matter in this way being fed outwardly and away from the blade.

Due to the symmetrical configuration of the blade-protecting device, the cleaning unit may work in all directions of movement parallel to the ground without any restrictions. No special protection is needed on the side of the cleaning unit facing the vehicle. The blade in combination with the blade-protecting device thus gives a very simple and efficient solution to the disadvantages which up to now has adhered devices for mechanical cleaning. The rotational speed of the blade will in principle not be limited upwardly (or downwardly) and can be chosen freely according to existing conditions. A speed normally used is about 2200 rpm.

POSSIBLE MODIFICATIONS OF THE INVENTION

The invention can of course be modified in many ways within the scope for the attached claims. The unit can for instance be mounted on any optional kind of boom. Any kind of motor can be used for driving the blade. The motor used may for instance be driven by means of petrol, or be driven hydraulically, electrically, pneumatically or in another suitable way. The motor furthermore does not have to be arranged directly in connection with the blade. The blade used can of course be of any optional kind. The arms have been illustrated as extending radially from the center of the hub out to about the periphery of the blade, where they have been bent downwardly past the edge of the blade, as well as bent slightly in the direction of the rotation of the blade. The arms may however be bent slightly along their entire free extent in order to further counteract a wedging of vegetational debris or similar. It is also conceivable that it may be suitable to bend the arms slightly upwards from the hub, the distance between the arm and blade thus increasing somewhat in the direction towards the periphery, which further would facilitate the removal of debris from the blade. It is furthermore conceivable to provide the upper side of the blade with teeth or similar, thus disintegrating matter wedged between arms and blade, or to provide the blade with spiral flanges feeding the matter outwardly. These features can of course be combined both mutually and with the bending of the arms. In another conceivable embodiment the arms are directed straight outwardly past the periphery of the blade, and are not bent downwardly past the edge of the blade. This may be suitable in certain special applications. The arms on the hub part do not have to be evenly and/or symmetrically distributed around the hub part, although this is suitable in the normal case. It may furthermore also be conceivable to arrange the protecting device on the under side of the blade, a condition of course being that a part of the frame extends past the blade or through the center of the blade. In this case the protective device may prevent that the blade comes into contact with the ground if the unit unintentionally is lowered or if the ground is very uneven.

I claim:

1. A blade protecting device for a cutter assembly having a rotatably blade supported on a shaft mounted in a cutter body, said shaft and said blade being driven by a motor, the blade protecting device comprising: a freely rotatable hub mounted on said cutter body concentrically relative to said shaft and adjacent said blade, and a plurality of blade protecting arms protruding substantially radially from said hub with portions extending beyond an outer periphery of said blade, said protecting arms being equiangularly spaced about said hub.

2. The blade protecting device of claim 1 wherein said portions of said protecting arms which extend beyond said outer periphery of said blade are bent in a direction of rotation of said blade.

3. The blade protecting device of claim 1 wherein said portions of said protecting arms which extend beyond said outer periphery of said blade are bent downwardly beyond a lower edge of the blade.

4. The blade protecting device of claim 1 wherein said cutter body is secured to a boom adapted for rotation about a vertical axis.

5. A cutter assembly adapted for mounting on a vehicle, said cutter assembly comprising:
   a cutter body secured to a boom, said boom mounted for rotation about a vertical axis;
   a cutter blade fixed to a shaft rotatably mounted in said cutter body and adapted to be rotatably driven by a motor;
   a hub secured to said cutter body in concentric relationship to said shaft, said hub mounted for free rotation relative to said cutter body and to said shaft; and
   a plurality of blade protecting arms protruding substantially radially from said hub with portions extending beyond an outer periphery of said blade, said protecting arms being equiangularly spaced about said hub.

6. The blade protecting device of claim 5 wherein said portions of said protecting arms which extend beyond said outer periphery of said blade are bent in a direction of rotation of said blade.

7. The blade protecting device of claim 5 wherein said portions of said protecting arms which extend beyond said outer periphery of said blade are bent downwardly beyond a lower edge of the blade.

8. The blade protecting device of claim 6 wherein said portions of said protecting arms which extend beyond said outer periphery of said blade are bent downwardly beyond a lower edge of the blade.

* * * * *